United States Patent Office
3,428,838
Patented Feb. 18, 1969

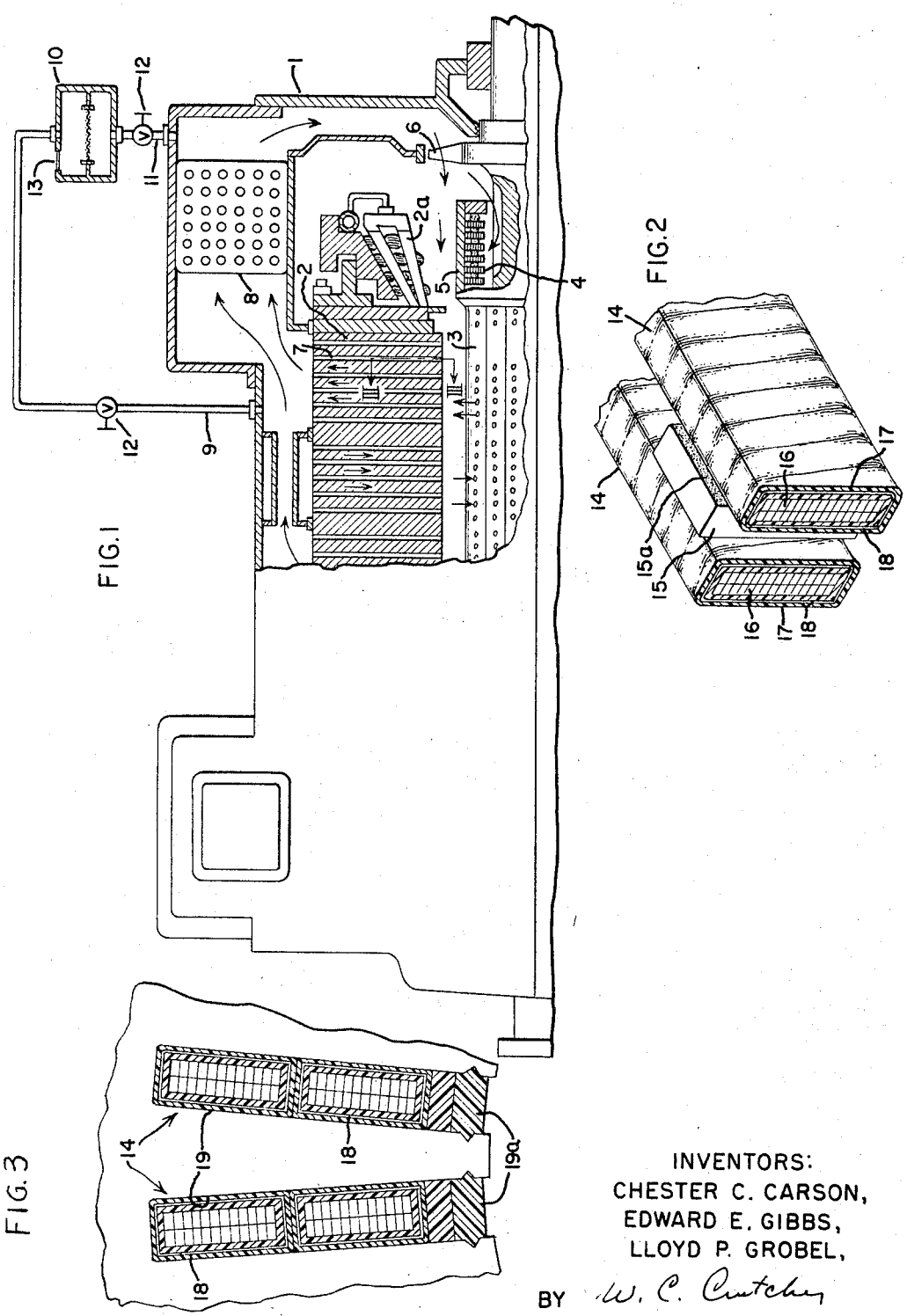

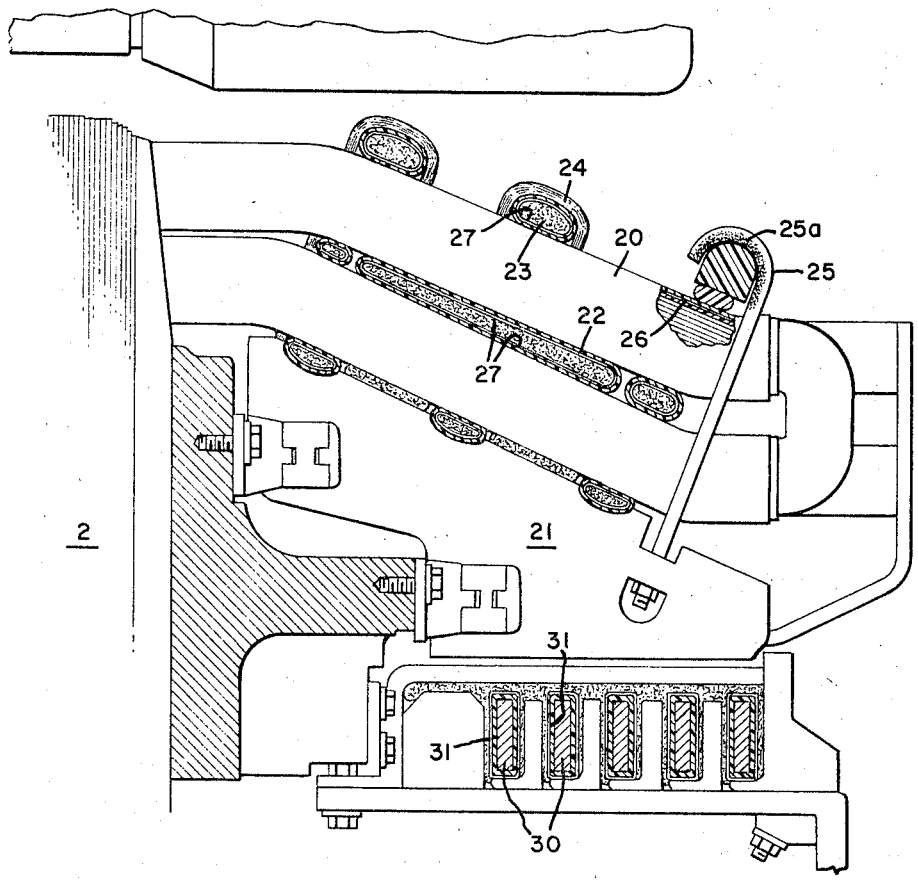

3,428,838
WEAR DETECTOR FOR FLUID-COOLED ELECTRIC MACHINE
Chester C. Carson, Ballston Spa, and Edward E. Gibbs and Lloyd P. Grobel, Schenectady, N.Y., assignors to General Electric Company, a corporation of New York
Filed Sept. 15, 1966, Ser. No. 579,568
U.S. Cl. 310—56                 8 Claims
Int. Cl. H02k 9/26

This invention relates to an improvement in detection of wear of parts in electric machines. More particularly, the invention relates to an improved arrangement for obtaining an external indication of wear of winding insulation in a fluid-cooled dynamoelectric machine while the machine is in operation and upon the occurrence of a predetermined degree of wear.

Various types of electric machines such as generators, motors, transformers, etc., have insulated electrical windings therein which are held in place by various types of supporting arrangements. Under some conditions, vibratory forces or cyclic thermal expansion tend to wear the insulation by rubbing with contacting bodies while the machine is in operation. The vibratory forces may be caused by electromagnetic forces in A-C machines or may be caused by the presence of a moving part such as the rotor in a generator or motor. Where the machine is closed and in operation for long periods of time, wear due to relative movement of the parts can damage the integrity of the insulation and cause severe damage, particularly in high voltage machines.

Many electrical machines employ a fluid coolant with means to circulate the coolant throughout the windings to carry off heat. Often the coolant employed is a gas such as hydrogen and the casing of the machine is gas tight with internal heat exchangers to cool the recirculated gas so as to continually remove heat from the windings.

Variable expansion and contraction as the windings heat and cool can also cause them to move cyclically and cause wear in the insulation over a long period of time. It is difficult to monitor the extent of wear that has taken place or where it has occurred inside the machine since the machine requires some considerable disassembly for inspection which is done only at infrequent intervals.

Accordingly, one object of the present invention is to provide an improved arrangement for detecting impact or rubbing wear of winding insulation in a gas-cooled electric machine.

Another object of the invention is to provide means to determine the location and extent of wear in such a machine.

Still another object of the invention is to provide a device to give an external indication of wear while the machine is in operation, only after a predetermined amount of wear has occurred.

The subject matter which is regarded as the invention is particularly pointed out and distinctly claimed in the concluding portion of this specification. The invention, however, both as to organization and the method of practice, together with further objectives and advantages thereof, may best be understood by reference to the following description, taken in connection with the accompanying drawing in which:

FIG. 1 is a schematic view, partly in section, of the upper half of a gas-cooled dynamoelectric machine, FIG. 2 is a partial view of two armature bars from the dynamoelectric machine in the end turn region, FIG. 3 is a cross section through the armature core slots, taken along line III—III of FIG. 1, and FIG. 4 is an elevation view, partly in cross section, illustrating typical applications of the wear detector in the end turn region.

Briefly stated, the invention is practiced by employing a layer of uniquely detectable material either in the winding insulation or on the supporting structure adjacent to the insulation, so that cyclic relative movement between the parts will expose the wear detecting layer and release particles of the material. The material is essentially "noncontributive" in so far as its insulating qualities or strength is concerned. In a preferred form of the invention, the detectable layer is below the surface of the usual material so that it is only exposed to rubbing and removal after a predetermined wear of the insulation or support has taken place. Means are provided to withdraw a portion of the coolant fluid, here gas, entraining the uniquely detectable particles and to give an indication when they appear in the gas.

Referring now to FIG. 1 of the drawing, a gas-cooled generator comprises a sealed casing 1 having a laminated stator core 2 and a cylindrical rotor 3. The stator core 2 is wound with insulated armature bars 2a, while portions of the rotor field windings 4 are held in place by retaining ring 5 of the rotor.

Coolant gas such as hydrogen is recirculated throughout casing 1 by a fan 6 in order to cool windings 3, 4, and the stator core 2. Various cooling flow arrangements may be employed, but the one shown utilizes radial in-and-out flow through stator ducts 7 between the lamination packages. Heat is removed from the gas in a cooler 8 and returns to the suction side of fan 6.

A test portion of the gas which has circulated over the windings and various parts of the generator is withdrawn through a pipe 9, passed through a simple filter detector 10 and returned through a pipe 11 to a space communicating with the suction side of fan 6. Valves 12 are provided to isolate detector 10 for maintenance.

In the preferred embodiment of the invention, detector 10 is a simple porous filter device such as manufactured by the Millipore Filter Corp. Good results were obtained with filter membranes 47 mm. in diameter composed of cellulose ester and designated type RA with a pore size of 1.2 microns ±0.3 micron. The filter is preferably disposed in a horizontal position with gas entering at the top. A window 13 may be utilized to view the filter during operation of the machine.

FIGS. 2–4 illustrate various methods of locating the the wear detecting layer so as to give an indication of wear. FIG. 2 illustrates two insulated armature bars 14 held apart by a blocking member 15 which can be reinforced cured resin or any other type of strong insulating material. Armature bars 14 are comprised of lightly insulated strands 16 inside a casing of ground insulation 17. Insulation 17 is made up of taped layers of mica flake-containing resin. Disposed beneath the top layer or two of insulating tape is a sub-surface wear detecting layer 18 of a material which contributes nothing significant to the insulating qualities but which is uniquely detectable among other particles which may appear in the gas stream. One suitable material is a layer of cadmium sulphide which provides brightly colored yellow particles which are easily distinguishable among other particles appearing on the filter. The wear detecting material may be applied as a paint or as a layer of tape. Various other types of materials such as copper phthalocyanine blue, cobaltous hydroxyquinone (which is red), magnesium chromate (which is yellow), zinc chromate (which is lemon yellow) and dyed or coated silica particles, might be used to produce colored particles observable on the filter. Also, the wear detecting layer need not be placed beneath layers of insulation itself, but may lay on top of the insulation or just below a layer of armor tape which is sometimes employed over the insulation proper.

The thickness of the layer in FIG. 2 and the other figures is greatly exaggerated for the purpose of explaining the invention. Actually the layer is quite thin and comparable to a coating of paint.

It is not necessary that the wear detecting layer be employed on the insulating member itself, nor that it be a subsurface layer. It can also be used on the member in contact with the insulation. FIG. 2 shows an external layer 15a applied to the opposite insulating block 15 which are adjacent bars 14. The layer 15a can be used in lieu of or composed of a different material than the subsurface layer 18 on the armature bar so as to indicate incipient or commencing wear with one color and then to indicate an actual predetermined wear of the insulation itself by a different color when layer 18 is exposed.

FIG. 3 of the drawing, illustrating a cross section through the slot, shows armature bars 14 disposed in slots 19 of the stator core and held in place by wedges 19a. Vibratory or thermal cycling may cause the armature bars 14 to move in the slots. The subsurface wear detecting layer 18 is applied in FIG. 3 in the same manner as shown in FIG. 2.

FIG. 4 of the drawing illustrates the end turn region of the dynamoelectric machine, wherein the extending end turns 20 of the coils are held in place against insulated axially slidable members 21 mounted on the stator 2. Insulating blocking members such as 22, 23 are used to separate the bars and hold the bars in place. Glass cord impregnated with resin, as indicated at 24, and tie bolts 25 hold the end turns securely in place. Also shown in FIG. 4 are cross sections of circumferential "collection rings" 30 which are connected to certain stator bars.

The electromagnetic forces tending to move the end turns are substantial, and the wear detector of the present invention is particularly useful on the armature bars in this location. A subsurface layer 26 is shown on armature bar 20. Also a wear detecting layer 31 is indicated on the collection rings 30.

As mentioned previously, it is not necessary that the wear detecting layer be used on the insulated conductor itself, but it may also be used on a blocking or support member contiguous with the insulated member which is also subject to relative movement. Here the blocking members 22 and 23 are shown with wear detecting layers 27. A suitable method consists of painting cadmium sulphide in a layer 27 upon the fiberglass reinforced resin core of the block and then applying the normal woven casing over the block. In the event that the woven casing is rubbed through, an indication of wear will be given.

A layer may also be used on the outside of a structural member disposed adjacent an insulating block or pad. Such a coating 25a is shown on the tie bolt 25, which acts in a manner similar to the block coating 15a in FIG. 2.

By employing different wear detecting materials at different locations, it is possible to know not only that wear is taking place, but the general location thereof. A further refinement lies in applying successive layers of different wear detecting materials so that the extent and rate of wear can be ascertained. In this way, it is feasible to continue to operate when particles of one color appear on the filter indicating light wear, but to shut down the machine when particles of another color appear indicating substantial wear has occurred.

It is also within the purview of the present invention to utilize more complex detecting methods than the one shown, so long as the material in the wear detecting layer is uniquely detectable from among the other particles in the fluid stream. A layer of radioactive substance and the use of a radiation counter in place of filter 10 will serve to give an indication when the radioactive particles enter the gas stream. Chemical tests can also be employed.

Another alternative is to fabricate the wear detecting layer using a special layer of insulating tape having inert larger particles disbursed therein which are noncontributive in so far as the insulation is concerned but which produce larger than usual particles in the gas stream when the wear detecting layer is subjected to abrasion. Such larger particles can be uniquely detected by commercially obtainable devices such as a Royco Particle Counter (Model PC 200A) or a Sinclair-Phoenix Aerosol, Smoke and Dust photometer, Model JM1000, which are more sensitive to larger particles.

Thus the wear detector serves to give an external indication of substantial insulation wear while the machine is in operation. By varying the depth of the wear detecting layer beneath the surface, by utilizing multiple layers of different materials, or by using different materials in different locations, it is possible to monitor the location, extent, and rate of wear within the electric machine. The use of the invention is equally applicable to liquid cooled members with suitable modification.

Other modifications of the invention will occur to those skilled in the art, and while it has been described what at present is considered to be the preferred embodiment of the invention, it is, of course, intended to cover in the appended claims all such modifications as fall within the true spirit and scope of the invention.

What is claimed as new and desired to secure by Letters Patent of the United States is:

1. In an electric machine having a pair of adjacent parts therein subject to cyclic forces during operation of the machine tending to produce relative motion therebetween, one of said parts serving to insulate the windings of the machine,
   means circulating fluid coolant through the machine and over the parts,
   one of said parts including a layer of material substantially noncontributive to the primary function of the part and having physical attributes distinguishable from the material of the insulating parts, said layer being disposed at the location where the parts touch one another,
   means withdrawing a test portion of the fluid coolant from the machine, and
   detector means arranged to provide an indication external to the machine when material from said layer is present in the fluid coolant.

2. An electric machine having insulating parts therein subject to cyclic forces during operation of the machine,
   means circulating fluid coolant through the machine and over the parts,
   said insulating parts including layers of material substantially noncontributive to the insulating qualities and having physical attributes distinguishable from the material of the insulating parts, said layers being disposed at potential rubbing locations of the parts,
   means withdrawing a test portion of the fluid coolant from the machine, and
   detector means providing an indication when material from said layers appears in the coolant.

3. The combination according to claim 2 wherein said material is selected from a group consisting of cadmium sulphide, copper, phthalocyanine, cobaltous hydroxyquinone, magnesium chromate and zinc chromate, and wherein said detector means comprises a porous filter.

4. The combination according to claim 2 wherein said layers are located beneath the surface of said insulating parts, whereby a predetermined wear of the surface takes place before the material from said layer can appear in the fluid coolant.

5. The combination according to claim 4, wherein the fluid coolant is hydrogen, and where the insulating parts comprise the ground insulation for the armature bars of a generator, and where the sub-surface layers comprise material having a different color than that of the ground insulation and where said detector means comprises a porous filter.

6. The combination according to claim 5, wherein the material of the sub-surface layer comprises cadmium sulphide.

7. The combination according to claim 6, wherein multiple layers of different colored materials are employed to indicate the degree of wear.

8. The method of detecting wear of insulating parts in a fluid cooled electric machine having parts therein subject to cyclic forces in operation, comprising the steps of:

providing layers of material at potential rubbing locations of said parts, which material is substantially noncontributive to the insulating qualities of the parts but which has physical attributes distinguishable from the insulating material thereof, withdrawing a test portion of the fluid coolant while the machine is in operation, and continuously passing the fluid test portion through a detector arranged to give an indication of particles in the test portion having said physical attributes.

References Cited

UNITED STATES PATENTS

| | | | |
|---|---|---|---|
| 2,903,993 | 9/1959 | Rautio | 116—117 |
| 2,951,954 | 9/1960 | Willyoung | 310—57 |
| 3,091,710 | 5/1963 | Shartrand | 310—57 |
| 3,199,488 | 8/1965 | Farr | 116—117 |

WARREN E. RAY, *Primary Examiner.*

R. SKUDY, *Assistant Examiner.*

U.S. Cl. X.R.

310—57, 179